March 13, 1928.
J. V. CUNNIFF
1,662,699
DIRIGIBLE REFLECTOR IN HEADLIGHTS
Filed Aug. 31, 1926
2 Sheets-Sheet 1
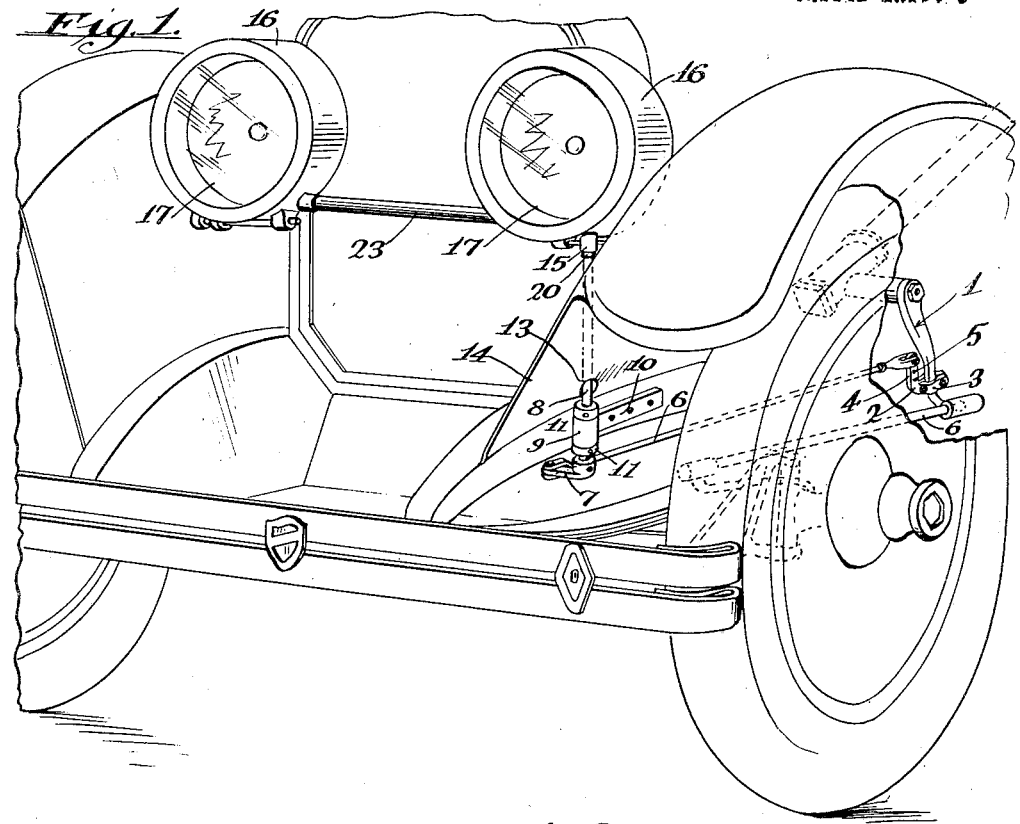
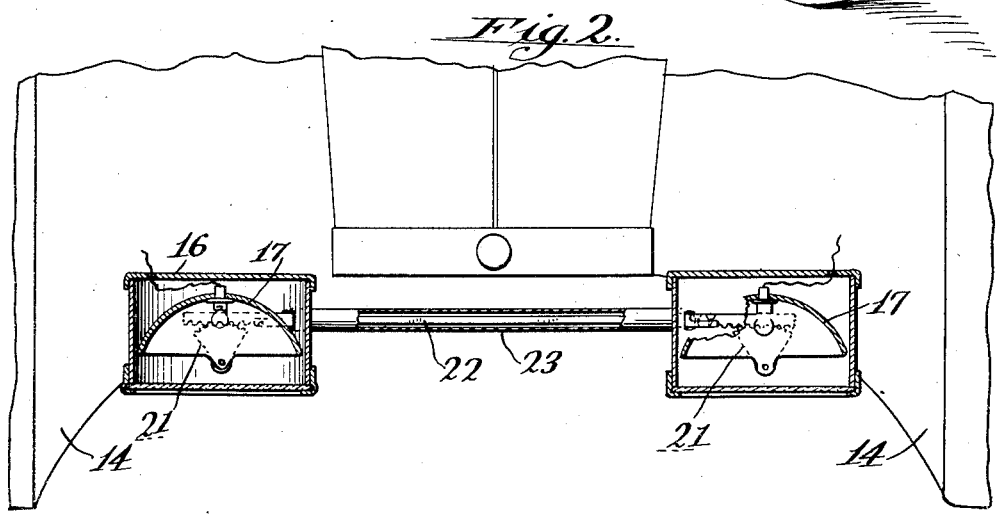
Inventor
John V. Cunniff.
by Hazard and Miller
Attorneys.

March 13, 1928.
J. V. CUNNIFF
1,662,699
DIRIGIBLE REFLECTOR IN HEADLIGHTS
Filed Aug. 31, 1926
2 Sheets-Sheet 2
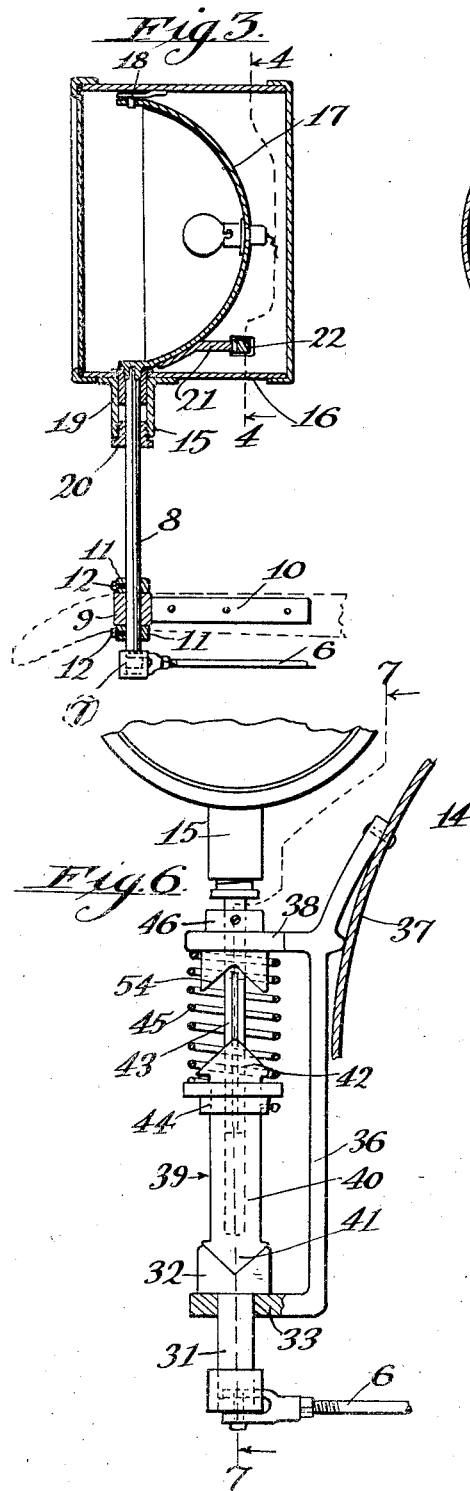
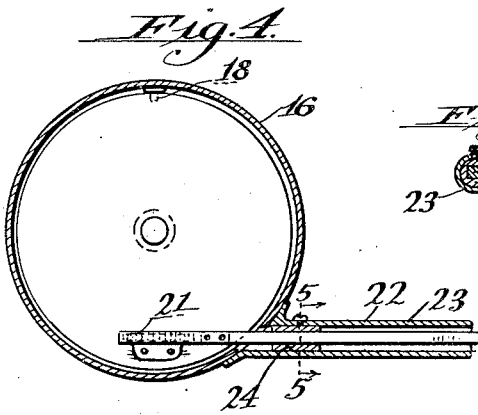
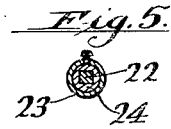
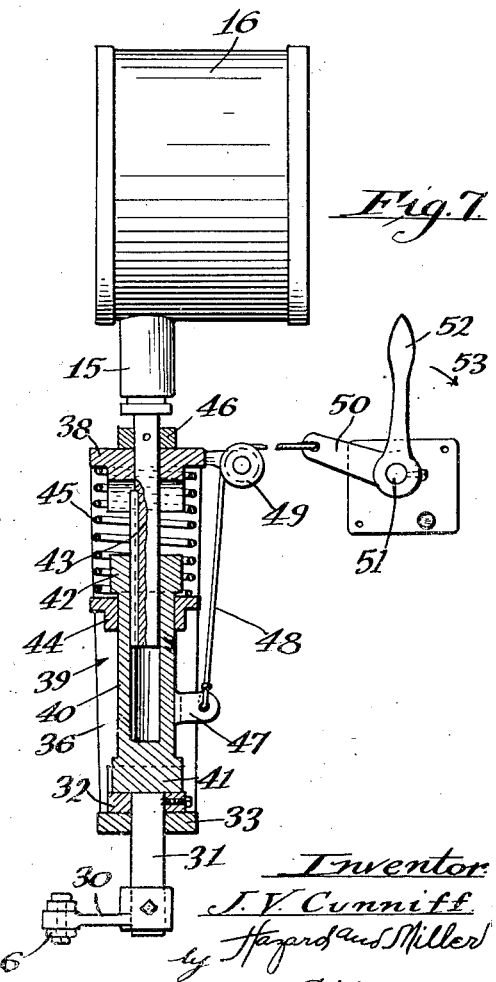
Inventor
J. V. Cunniff
by Hazard and Miller
Attorneys Patented Mar. 13, 1928.

1,662,699

UNITED STATES PATENT OFFICE.

JOHN V. CUNNIFF, OF LOS ANGELES, CALIFORNIA, ASSIGNOR TO SAFEWAY HEADLIGHTS, INCORPORATED, A CORPORATION OF DELAWARE.

DIRIGIBLE REFLECTOR IN HEADLIGHTS.

Application filed August 31, 1926. Serial No. 132,695.

My invention is a dirigible reflector in a headlight for automobiles, said reflector turning in accordance with the direction in which the vehicle is turned.

An object of my invention is the construction of a dirigible reflector in a headlight for an automobile in which the reflectors of the headlights are pivotally mounted in stationary headlight casings or housings and having means operated by the steering mechanism to turn one of the reflectors and interengaging means with the other reflector to turn the other reflector.

A further object of my invention is to form a disengageable connection between the mechanism connected to the steering gear or mechanism so that same may be disengaged from the movable reflectors and the reflectors be clamped or centered in a straight ahead direction.

In constructing my invention I attach a bracket to the steering arm of an automobile, said arm usually being mounted on a horizontal shaft to swing in a fore and aft direction. A link is connected from the bracket to a crank, the crank being operatively connected to a vertical shaft structure. This shaft structure is connected at its upper end to one of the headlight reflectors, turning same as the shaft is oscillated. The reflectors are provided with segmental teeth engaging a transversely mounted rack bar, said bar being operated to shift both headlight reflectors similarly.

In the centering feature of my invention the vertical shafts are constructed telescopically and have spring means to retain same in engagement with a clutch element operated by the crank and having a remote control device operable from the driver's compartment to disengage the clutch elements and having a centering device to center the reflectors in position to illuminate straight ahead.

My invention is illustrated in the following drawings, in which:

Figure 1 is a perspective view of the forward end of an automobile, showing the mounting and general connecting mechanism for the dirigible reflector in headlights;

Fig. 2 is a plan view partly broken away, showing the mounting for the pivoted reflectors;

Fig. 3 is a vertical section through one of the headlights, showing in elevation the shaft for operating same;

Fig. 4 is a vertical section through the back of the headlight housing or casing, taken on the line 4—4 of Fig. 3 in the direction of the arrows;

Fig. 5 is a transverse section on the line 5—5 of Fig. 4 in the direction of the arrows;

Fig. 6 is a front elevation of an alternative construction showing the mechanism for clutching the pivotally mounted headlight reflectors to an oscillating crank shaft;

Fig. 7 is a vertical section on the line 7—7 of Fig. 6 in the direction of the arrows.

The construction illustrated in Figs. 1 to 5 is substantially as follows:

The automobile is provided with the usual pivotally mounted steering arm 1. This arm has a bracket 2 secured thereto by a clamping device 3. The bracket has a free end 4 extending substantially parallel to the steering arm and having a series of adjusting apertures 5 therein. A link 6 is connected to a crank 7 of a shaft 8, this shaft being mounted in a journal 9 shown as secured by a strap or the like 10 to one of the forward frames of the automobile. The crank shaft is retained in proper position by locking collars 11 having set screws 12 or the equivalent. The crank shaft is a vertical shaft which extends through an opening 13 in the fender 14 and passes through a suitable upper journal 15 extending downwardly from the headlight housing or casing 16.

The reflector 17 for the headlight is attached to the top of the housing by a pivot pin 18 and a suitable support for said pin. The lower side of the reflector is attached to the vertical crank shaft 8 by a spline or other connection 19. There may be a suitable gland 20 to allow the journal 15 to be properly lubricated and maintained substantially oil tight by a packing or the like.

The rear side of each reflector is provided with a toothed segment 21 having gear teeth thereon and a suitable rack bar 22 is slidably mounted in a tube 23 connecting the headlight housing, there being blocks 24 suitably held in position in the tube forming journals for the sliding rack bar.

The manner of operation of the above mentioned construction is substantially as follows:

It will be understood that as the steering wheel is operated the steering arm swings forwardly and backwardly in a vertical plane, operating the steering wheels and at the same time moving the link 6 and the crank 7 of the crank shaft 8. This communicates motion to one of the headlight reflectors and through the medium of the toothed segments and the rack bar the motion is transmitted to the other headlight reflector. It will be understood that the headlight reflector which is not directly connected to the vertical shaft will have a pivot at the base, somewhat similar to that at the upper side.

In the construction of Figs. 6 and 7 the link 6 is connected to a crank 30 attached to a short vertical crank shaft 31, this shaft having a V-shaped clutch element 32 secured to its upper end, the clutch element resting on the lower end 33 of a bracket 36 attached to the fender 37. This bracket 36 has an upper arm 38 with an aperture therethrough for a purpose hereunder set forth.

A telescoping shaft designated by the numeral 39 has a lower sleeve 40 with a wedge-shaped lower end 41 and with a similar wedge-shaped upper end 42. A spline shaft 43 telescoping therein is connected to the sleeve to rotate therewith. A collar 44 is attached to the sleeve on the outside and a compression spring 45 conveys a thrust between the plate 38 and the collar 44, thereby always tending to maintain the lower wedge end 41 fitting in the V-shaped clutch collar 32. The upper end of the spline shaft 43 is connected to a headlight reflector in a suitable manner and this may be in such manner as shown in Fig. 3. The spline shaft is maintained in proper adjustment by a collar 46 secured thereto, such collar bearing on the plate 38.

In order to disconnect the dirigible or shiftable reflector features and to center the reflectors for straight ahead illumination, I provide the following mechanism: A lug 47 is secured to the sleeve 40 and a flexible cable 48 leads over a pulley 49 to a bell crank 50 mounted on a pivot 51 and having a handle 52. This crank is of such construction so that when the handle is shifted in the direction of the arrow 53 the sleeve 40 is raised, disengaging the lower wedge 41 and the V-shaped clutch 32, thereby preventing rotation of the headlight when the link 6 is reciprocated.

The plate 38 is provided with downwardly facing V-shaped notches 54 which engage the upper wedge-shaped end 42 of the sleeve 40 and cause a centering of the sleeve relative to the plate 38 and hence centering the headlight reflectors in accordance with the position of this V-shaped notch. Thus it will be seen that the operator of the vehicle by moving the bell crank 50 may elevate the telescopic shaft 39 and center the reflectors to shine straight ahead. It is intended that the device shown in Figs. 6 and 7 with the telescopic vertical shaft may be substituted for that of Figs. 1 and 3, showing the solid vertical crank shaft for turning the reflectors.

It is obvious that my invention may be considerably changed in general features and in specific details to adapt same to different automobile constructions and constructions of headlights, and their installation. Such changes would be within the spirit of my invention as set forth in the description, drawings and claims.

Having described my invention, what I claim is:

1. A headlight comprising in combination a fixed headlight housing having a pivoted reflector therein, a telescopic shaft having a lower sleeve and an upper splined shaft connected thereto, said upper shaft being connected to the reflector, a crank shaft having a clutch element, means connecting said crank shaft to a moving part of a steering mechanism, a clutch element on the crank shaft, a cooperating clutch element on the sleeve, a spring, an arm connected to part of the automobile, and a spring between said arm and a connection to the sleeve.

2. A headlight as claimed in claim 1, having a V-shaped centering device connected to the said arm, a wedge-shaped inter-engaging element on the upper end of the sleeve, a flexible cable connected to the sleeve, and means remote from the headlight to operate said cable.

3. A headlight comprising in combination a fixed headlight housing having a pivoted reflector therein, a bracket having an upper arm, a telescopic shaft extending downwardly through said arm from the reflector, said shaft having a lower sleeve and an upper spline shaft connected thereto, the upper shaft being connected to the radiator, a crank shaft extending upwardly through a lower arm of the bracket and having a clutch element, a cooperating clutch element on the sleeve, a compression spring interconnected between the upper arm of the bracket and the sleeve, said upper arm having a V shaped centering notch, the upper end of the sleeve having a wedge shaped upper end to engage therewith, a flexible means connected with the sleeve to disengage the lower clutch elements and to engage the upper wedge with the notch to center the reflector, and means connecting the crank to a steering mechanism.

4. A headlight comprising in combination a fixed headlight housing, a fixed bracket having upper and lower arms with openings therethrough, a shaft journaled in the opening in the upper arm, a movable reflector in the housing connected to said shaft, a slidable sleeve mounted on said shaft and splined thereto, a collar adjustably mounted on the sleeve, a compression spring between the collar and the upper arm of the bracket, the sleeve having a wedge shaped upper end, a V shaped centering notch depending from the upper arm, a crank shaft journaled in the opening of the lower arm and having a V shaped clutch element, the sleeve having a wedge shaped lower end to engage therewith, means connecting the crank to a steering mechanism, and a flexible cable connected to the sleeve and having means to operate same, said cable lifting the sleeve and disengaging the clutch elements and engaging the notch and the V shaped upper end of said sleeve.

5. A headlight comprising in combination a fixed headlight housing having a pivoted reflector therein, a telescopic shaft connected to said reflector, a crank shaft having a clutch, means connecting the crank shaft to a moving part of a steering mechanism, a spring connected between a fixed structure and a slidable part of the telescopic shaft, to engage said shaft with the clutch, flexible means having a control remote from the headlight to raise the slidable part of the telescopic shaft from engagement with the clutch, and having a fixed centering device and means on the movable part of the telescopic shaft to engage therewith to center the headlight reflector in a fixed direction.

In testimony whereof I have signed my name to this specification.

JOHN V. CUNNIFF.